Feb. 18, 1936.  E. C. SCOTT  2,031,508
BATTERY HOLDER
Filed April 29, 1935
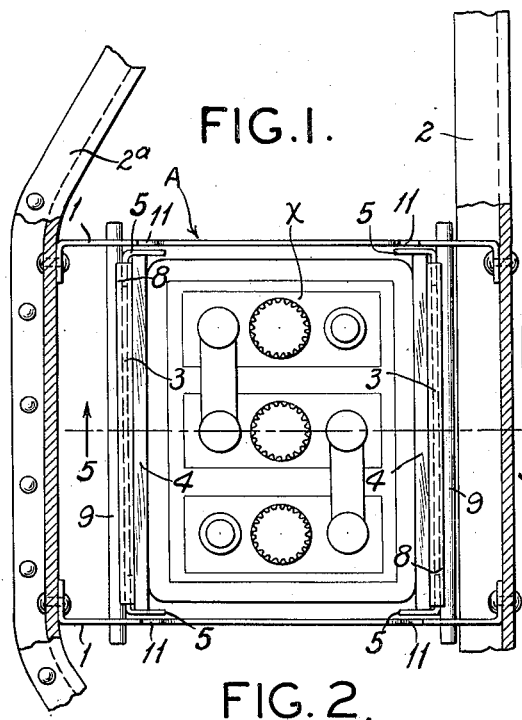
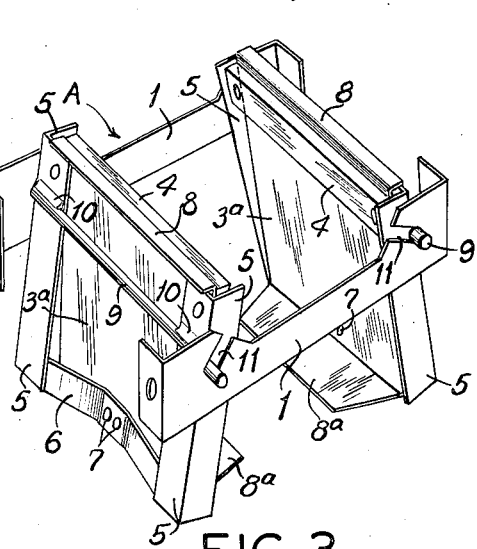
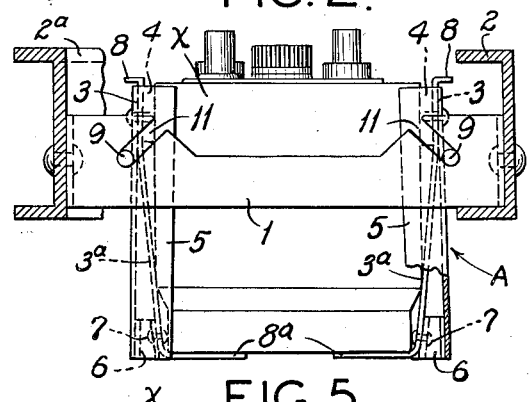
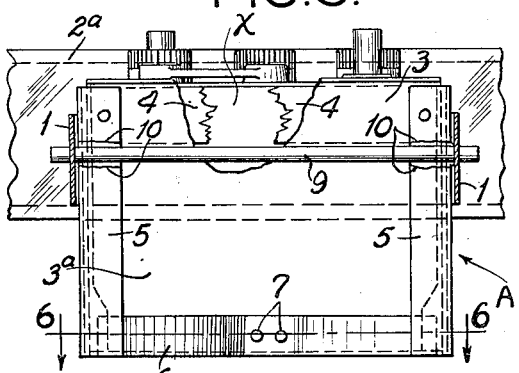
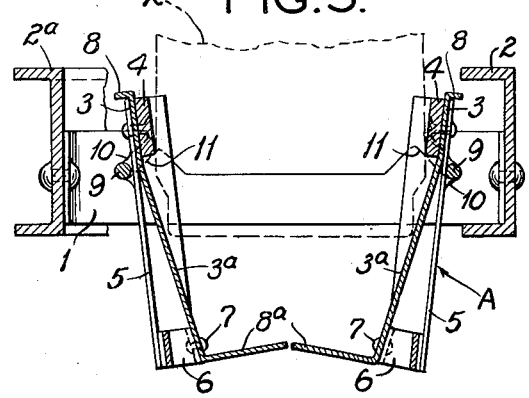
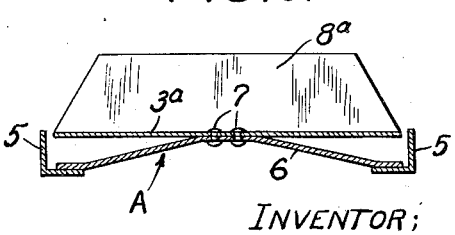
INVENTOR;
ELMO C. SCOTT
BY Bakewell & Church
ATTORNEYS Patented Feb. 18, 1936

2,031,508

UNITED STATES PATENT OFFICE 2,031,508

BATTERY HOLDER

Elmo C. Scott, St. Louis, Mo.

Application April 29, 1935, Serial No. 18,748

11 Claims. (Cl. 180—68.5)

This invention relates to battery holders, and is an improvement on the invention that forms the subject-matter of my prior U. S. Patent No. 1,911,401, dated May 30, 1933.

The main object of my present invention is to provide a device that will support and securely hold the storage battery of a power-operated vehicle; that is easy to attach to the chassis of the vehicle, and which is composed of only a few rugged parts of simple design that can be manufactured and assembled at a low cost.

Another object of my present invention is to provide a battery holder, which, in addition to having many of the desirable characteristics and features of the battery holder described in my said prior patent, is of such design that the opposed clamping members grip the upper edge portion and the lower edge portion of the battery case.

Briefly described, my improved battery holder is composed of or comprises opposed clamping members pivotally mounted on a supporting structure, and provided with yielding or spring-pressed portions arranged so that the operation of introducing the battery into the holder creates or produces a powerful spring pressure that is used to cause the clamping members to tightly grip the battery case at a plurality of widely separated points. Preferably, the clamping members are arranged so as to form in effect a hollow structure adapted to receive the battery, and provided with stout leaf springs arranged so that when the battery is moved downwardly into operative position between the clamping members, tension will be set up in said springs, and the resulting pressure utilized to force the lower end portions of the clamping members into engagement with the battery case and also exert leverage on the clamping members in a direction to force the upper end portions of same into tight engagement with the upper portion of the battery case. The co-acting parts of the device may be constructed and arranged in various ways without departing from the spirit of my invention, but I prefer to construct the clamping members in the form of two self-contained units that have no direct connection with each other, and each of which is provided at its lower end with a flexible or yielding portion backed up by a spring and arranged in spaced relationship with a rigid or unyielding portion of the unit, said units being pivotally mounted on a supporting structure that is attached to the chassis of the vehicle prior to the operation of combining said units with said supporting structure. In the operation of introducing the battery into the holder, the force or pressure which the battery case exerts on the yielding or flexible portions at the lower ends of the clamping members, compresses the springs that back up said yielding portions and also exerts an outward force or pressure on the lower ends of the rigid or unyielding portions of the clamping members, thereby causing the upper ends of the clamping members to tightly grip the upper end portion of the battery case.

Figure 1 of the drawing is a top plan view of my improved holder illustrating a battery arranged in operative position in same.

Figure 2 is an end view of said battery holder.

Figure 3 is a side elevational view of said battery holder.

Figure 4 is a perspective view of said battery holder.

Figure 5 is a transverse sectional view, taken on the line 5—5 of Figure 1, illustrating the operation of introducing the battery into the holder; and Figure 6 is a horizontal sectional view of one of the clamping members, taken on the line 6—6 of Figure 3, looking in the direction indicated by the arrows.

In the accompanying drawing which illustrates the preferred form of my present invention, the reference character 1 designates two horizontally-disposed, parallel supporting members 1 attached in any preferred manner to frame members 2 and 2ª of the chassis of the vehicle on which the battery holder is used, and the reference character A designates as an entirety two clamping members pivotally mounted on the supporting member 1 in opposed relationship and adapted to grip the sides of the case of a storage battery $x$ so as to support and rigidly hold said battery. The clamping members A may be constructed in various ways without departing from the spirit of my invention, but I prefer to make each of said clamping members from a substantially rectangular-shaped metal plate which is bent on a horizontal line intermediate its top and bottom edges so as to produce two angularly-disposed portions 3 and 3ª, as illustrated in Figures 4 and 5. The upper portion 3 of said plate has a horizontally-disposed strip 4 of wood or other suitable material, attached to the inner side of same, so as to form a battery engaging portion, and the two clamping members A are mounted on the supporting structure in such a way that when the battery $x$ is in the holder, the distance between the battery engaging portions 4 of said clamping members will be approximately equal to the width of the battery case.

The portions 3ᵃ of the rectangular-shaped metal plates previously referred to constitute yielding, spring-pressed or flexible battery engaging portions, that are adapted to grip the lower end portion of the sides of the battery case. Said yielding portions 3ᵃ are arranged in spaced relationship with rigid or unyielding portions of the clamping members, formed preferably by angles or other substantially rigid elements 5 that are attached to the outer sides of the upper end portions 3 of the clamping members in such a way that they project downwardly from same and overlap the portions 3ᵃ of the clamping members. The portions 3ᵃ are backed up by springs which are herein illustrated as consisting of flat, horizontally-disposed, cambered or curved leaf springs 6 attached to the outer sides of the portions 3ᵃ by rivets 7 or in any other suitable way, and arranged so that the ends of said springs will bear against the inner sides of the depending rigid portions 5 of the clamping members, as shown in Figure 6. In the operation of forcing the battery downwardly into operative position between the clamping members, the battery exerts pressure on the portions 3ᵃ in a direction to flex or move said portions outwardly, whereby the springs 6 will be compressed and the force or pressure of said springs utilized to press the portions 3ᵃ against the battery case and also to exert an outward thrust on the lower ends of the rigid or unyielding portions 5 of the clamping members, thereby tending to swing the clamping members on their pivots in a direction to force the upper end portions of said clamping members into snug engagement with the battery case. The upper end portions 3 of the clamping members are reinforced and strengthened by flanges 8 formed integral with same, and the lower end portion 3ᵃ of each clamping member is provided with an integral, inwardly-projecting flange 8ᵃ, which, in addition to acting as a strengthening device for said portion, also constitutes a stop that co-operates with the bottom of the battery case to limit the downward movement of the battery in the operation of introducing the battery into the holder. The angles 5 that constitute the rigid or unyielding portions of the clamping members are preferably arranged vertically at the ends of the clamping members and disposed so that one flange of each angle will project inwardly in overlapping relationship with the battery case, as shown in Figure 1.

It is immaterial how the clamping members A are pivotally mounted on the supporting members 1, but I prefer to provide each clamping member with a horizontally-disposed rod 9 arranged on the outside of same, so that it acts as a tie bar for the two angles 5 of the clamping member and also forms trunnions at the ends of the clamping member, which are adapted to rest on the supporting members 1, the rods 9 being rigidly attached to the angles 5 preferably by welds 10, as shown in Figure 3. In order to reduce the cost of the device, and facilitate the assembling of the parts of same, the clamping members A are so designed that each clamping member can be constructed as a complete unit, and thereafter arranged in operative position on the supporting bars 1 after said bars have been attached to the frame members 2 and 2ᵃ of the chassis. To this end I form open-ended slots 11 in the supporting members 1 for receiving the trunnions formed by the end portions of the rods 9 of the clamping members A. To mount or install the clamping members it is only necessary to arrange said members in an upright position between the supporting bars 1 with the end portions of the rods 9 positioned in the open upper ends of the slots 11, and then move said clamping members downwardly so as to cause said trunnions to be positioned at the lower closed ends of said slots. Preferably, the two slots 11 of each supporting member 1 are inclined in opposite directions, as shown in Figure 2, so that after the battery has been arranged in operative position between the clamping members, it will be impossible for the trunnions of the clamping members to move upwardly out of the slots 11, due to the fact that said slots comprise top walls that overhang or lap over the trunnions.

When the holder is empty, the clamping members A stand at an angle to each other, with their upper ends inclined inwardly, as shown in Figure 4. To mount or install the battery in the holder, the upper ends of the clamping members are swung outwardly or spread sufficiently to permit the lower end portion of the battery to be positioned between the upper ends of the clamping members, as shown in broken lines in Figure 5. Thereafter, the battery is moved downwardly between the clamping members, thereby causing the portions 3ᵃ of the clamping members to be forced outwardly, due to the wedging or spreading action of the battery on said portions 3ᵃ. The outward movement or flexing of the portions 3ᵃ compresses the springs 6, and the pressure that is thus produced or created is utilized to force the portions 3ᵃ into tight engagement with the lower end portion of the battery case and also to exert an outward thrust on the lower ends of the rigid portions 5 of the clamping members, whereby the strips 4 at the upper ends of said clamping members will be forced inwardly into tight engagement with the upper portion of the battery case. Thus, it will be seen that in my improved battery holder the battery case is gripped tightly at a number of widely separated points by the portions 4 and 3ᵃ, which are maintained in tight clamping engagement with the upper and lower end portions of the battery case by the lever-like action of the rigid parts 5 of the clamping members, and the spring action of the portions 3ᵃ of the clamping members, the co-acting parts of the structure being so constructed and arranged that the battery constantly exerts a force or pressure on the clamping members in a direction tending to increase the tension of the spring-pressed portions 3ᵃ and to increase the leverage of the pivotally mounted rigid parts 5 of the structure.

While my present battery holder is similar to the battery holder described in my prior patent previously mentioned, in that it will support the battery and hold it rigid, without liability of causing the battery case to buckle; it does not require screws, nuts or similar fastening devices to be manipulated to clamp or release the battery, and it is provided with opposed clamping members whose upper ends are forced into tight clamping engagement with the battery during the operation of introducing the battery into the holder; it is an improvement upon my said prior battery holder, insofar as it is cheaper to manufacture; it is easier to install on the chassis of a vehicle, and it is provided with portions that grip both the upper and lower end portions of the battery case.

Having thus described my invention, what I claim as new and desire to secure by Letters Patent is:

1. A battery holder provided with a pivotally mounted clamping member and a spring, constructed and arranged so that the operation of introducing the battery into the holder creates a tension in said spring which is utilized to force a portion of said member into tight engagement with the lower end portion of the battery and is also utilized to rock said clamping member in a direction to force the upper end of same into tight engagement with the upper end portion of the battery case.

2. A battery holder provided with opposed pivotally mounted clamping members between which the battery is adapted to be positioned, yielding battery engaging portions at the lower ends of said clamping members, and springs disposed so that the outward movement of said yielding portions, produced by the engagement of the battery case with the same during the operation of inserting the battery into the holder, sets up a tension in said springs which is used to hold the upper and lower end portions of the clamping members in tight engagement with the battery case.

3. A battery holder provided with opposed, pivotally mounted clamping members, between which the battery is adapted to be arranged, yielding battery engaging portions at the lower ends of said members arranged at the inner side of same, unyielding portions on said clamping members arranged in spaced relationship with said yielding portions, and springs between the yielding and unyielding portions of each clamping member, for the purpose described.

4. A battery holder provided with opposed, pivotally mounted clamping members, between which the battery is adapted to be arranged, yielding battery engaging portions at the lower ends of said members arranged at the inner side of same, unyielding portions on said clamping members arranged in spaced relationship with said yielding portions, springs between the yielding and unyielding portions of each clamping member, for the purpose described, and stops on the yielding portions of said clamping members for limiting the downward movement of the battery.

5. A battery holder, comprising a supporting structure, opposed pivotally mounted clamping members on said structure, made in the form of separate and distinct units that have no direct connection with each other, said clamping members being arranged in such relationship that the distance between the upper ends of said members, when the battery is in operative position, is approximately equal to the width of the battery, and yielding battery engaging portions at the lower ends of said clamping members that are maintained under tension by the engagement of same with the sides of the battery case.

6. A battery holder, composed of pivotally mounted clamping members arranged in opposed relationship on a supporting structure, each of which members comprises a substantially rectangular-shaped plate bent slightly so as to produce upper and lower portions that are disposed at an angle to each other, depending rigid members on the outer side of the upper portion of said plate attached to same and arranged in overlapping relationship with the lower portion of said plate, and a flat leaf spring attached to the outer side of said lower portion and arranged with its ends in engagement with said depending rigid members.

7. A battery holder of the kind described in claim 6, in which said depending members are formed from angles and said plate is provided at its top and bottom edges with flanges.

8. A battery holder of the kind described in claim 6, in which said depending members are tied together by a horizontally-disposed rod whose end portions serve as trunnions for said clamping member, and means for reinforcing and strengthening the top and bottom edge portions of said plate.

9. In a battery holder, the combination of supporting members provided with open-ended slots, and opposed clamping members provided with trunnions positioned in said slots, said slots being disposed so that the trunnions cannot move upwardly out of same when the battery is in operative position in the holder.

10. A battery holder, comprising a pair of spaced, horizontally-disposed supporting members permanently attached to the chassis of a power-operated vehicle and provided with open-ended slots, a pair of opposed, pivotally mounted clamping members provided with trunnions positioned in the slots of said supporting members, yielding or flexible portions at the lower ends of said clamping members adapted to be contacted by the lower end portion of the battery case and disposed at a slight angle to the upper end portions of said clamping members which engage the upper end portion of the battery case, cambered leaf springs attached to the outer side of said yielding portions, and rigid parts on said clamping members that act as abutments on which the ends of said cambered springs exert a thrust in a direction tending to force the upper ends of said clamping members inwardly.

11. In a battery holder, the combination of supporting members provided with open-ended slots, and opposed clamping members provided with trunnions positioned in said slots, the slots that receive the trunnions of one clamping member being inclined oppositely to the slots that receive the trunnions of the other clamping member.

ELMO C. SCOTT.